United States Patent
Leung et al.

(10) Patent No.: US 12,436,967 B2
(45) Date of Patent: Oct. 7, 2025

(54) VISUALIZING FEATURE VARIATION EFFECTS ON COMPUTER MODEL PREDICTION

(71) Applicant: THE TORONTO-DOMINION BANK, Toronto (CA)

(72) Inventors: Kin Kwan Leung, Toronto (CA); Barum Rho, Toronto (CA); Yaqiao Luo, Toronto (CA); Valentin Tsatskin, Toronto (CA); Derek Cheung, Toronto (CA); Kyle William Hall, Baltimore (CA)

(73) Assignee: The Toronto-Dominion Bank, Toronto (CA)

( * ) Notice: Subject to any disclaimer, the term of this patent is extended or adjusted under 35 U.S.C. 154(b) by 132 days.

(21) Appl. No.: 17/743,173

(22) Filed: May 12, 2022

(65) Prior Publication Data
US 2022/0405299 A1    Dec. 22, 2022

Related U.S. Application Data

(60) Provisional application No. 63/213,684, filed on Jun. 22, 2021.

(51) Int. Cl.
G06F 16/26    (2019.01)
G06F 16/28    (2019.01)

(52) U.S. Cl.
CPC ............ *G06F 16/26* (2019.01); *G06F 16/283* (2019.01); *G06F 16/285* (2019.01)

(58) Field of Classification Search
CPC ....... G06F 16/26; G06F 16/285; G06F 16/283
See application file for complete search history.

(56) References Cited

U.S. PATENT DOCUMENTS 10,339,181 B1   7/2019  Singh et al.
10,510,022 B1   12/2019 Tharrington, Jr. et al.
(Continued)

OTHER PUBLICATIONS

Goldstein, et al., "Peeking Inside the Black Box: Visualizing Statistical Learning with Plots of Individual Conditional Expectation," Journal of Computational and Graphical Statistics, vol. 24, No. 1, arXiv:1309.6392v2 [stat.AP], Mar. 21, 2014, 22 pages; https://arxiv.org/pdf/1309.6392.pdf?ref=hackernoon.com.

(Continued)

*Primary Examiner* — Sherief Badawi
*Assistant Examiner* — Earl Levi Elias
(74) *Attorney, Agent, or Firm* — Patent Capital Group

(57) ABSTRACT

A model visualization system analyzes model behavior to identify clusters of data instances with similar behavior. For a selected feature, data instances are modified to set the selected feature to different values evaluated by a model to determine corresponding model outputs. The feature values and outputs may be visualized in an instance-feature variation plot. The instance-feature variation plots for the different data instances may be clustered to identify latent differences in behavior of the model with respect to different data instances when varying the selected feature. The number of clusters for the clustering may be automatically determined, and the clusters may be further explored by identifying another feature which may explain the different behavior of the model for the clusters, or by identifying outlier data instances in the clusters.

20 Claims, 10 Drawing Sheets

(56) References Cited

U.S. PATENT DOCUMENTS

| | | | | |
|---|---|---|---|---|
| 2018/0028079 | A1* | 2/2018 | Gurevich | A61B 5/7232 |
| 2018/0286092 | A1* | 10/2018 | Wright | G06F 3/04845 |
| 2020/0349395 | A1* | 11/2020 | Nushi | G06F 11/3692 |
| 2020/0372362 | A1* | 11/2020 | Kim | G06N 3/045 |
| 2021/0049503 | A1* | 2/2021 | Nourian | G06F 11/3466 |
| 2021/0142169 | A1* | 5/2021 | De | G06N 5/01 |
| 2022/0374598 | A1* | 11/2022 | Osuala | G06F 40/279 |

OTHER PUBLICATIONS

International Search Report and Written Opinion issued in PCT/CA2022/050748 on Aug. 10, 2022; 9 pages.
Britton, "VINE: Visualizing Statistical Interactions in Black Box Models," arXiv:1904.00561v1 [cs.LG], Apr. 1, 2019, 11 pages; https://arxiv.org/pdf/1904.00561.pdf.
Grinstein, et al., "clusterICE: Clustering of ICE and d-ICE curves by kmeans," May 2, 2019, 3 pages; https://rdrr.io/cran/ICEbox/man/clusterICE.html.
I. Research, "AI Explainability 360," https://aix360.mybluemix.net/ Github: https://github.com/Trusted—AVAIX360, accessed Jun. 19, 2021, 2 pages.
NumPy, "NumFOCUS DEI research study—call for participation," © 2022, 4 pages; https://numpy.org.
Pandas-dev/pandas: Pandas 1.4.2, DOI: 10.5281/zenodo, 6408044, Apr. 2, 2022, 4 pages.
Shapley, "The Shapley value," Cambridge University Press, © 1988, ISBN 0-521-36177-X, 14 pages.
Shapley, "A Value for n-Person Games," Princeton University Press, © 2016, 3 pages; https://doi.org/10.1515/9781400881970-018.
Shapley, "A Value for n-Person Games," Princeton University Press, 1953, 2 pages; https://doi.org/10.1515/9781400881970-018.
The Pandas Development Team, "What's new in 1.0.1," Feb. 5, 2020, 2 pages; https://pandas.pydata.org/pandas-docs/dev/whatsnew/v1.0.1.html.
Vega—A Visualization Grammar, Version 5.22.1; retrieved from the Internet on May 12, 2022, 1 page; https://vega.github.io/vega/.

* cited by examiner

VISUALIZING FEATURE VARIATION EFFECTS ON COMPUTER MODEL PREDICTION

CROSS-REFERENCE TO RELATED APPLICATION

This application claims the benefit of provisional U.S. application No. 63/213,684, filed Jun. 22, 2021, the contents of which are incorporated herein by reference in their entirety.

BACKGROUND

This disclosure relates generally to visualizing computer model behavior and more particularly to visualizing data instance clusters for selected feature variation of data instances on model outputs.

Modern, complex computer models can include a large number of layers that interpret, represent, condense, and process input data to generate outputs. While the complexity of these models is often beneficial in improving a model's outputs with respect to a desired learning objective, the complexity may be a severe drawback for human understanding of the relationship between model inputs (e.g., an individual data instance) and the output. As the complexity of the models increases, the processing and functions within may become more and more difficult to interpret, particularly as the effective function between inputs and outputs may vary significantly according to the region of the input space in which the model forms a prediction, also termed an output. Moreover, understanding and visualizing the effects of different inputs on the model output may be further complicated by multidimensional feature vectors, such that understanding the character of a particular data point and how the different values for a feature effect the output of a model. While pure numerical or data-based information for the model may provide some information (e.g., what features are most determinative, or what weights in the model have the highest parameters and how they affect the model), these may be ineffective to explain more nuanced or complex model behavior or behavior in uncommon individual cases or in different areas of the feature space. As such, there is a need for further improvement to understand and visualize model behavior across different portions of the data set.

SUMMARY

A model visualization system provides a way to visualize and understand behavior of complex, "black box" computer models by analyzing the effects of modifying individual data instances with respect to a selected feature and clustering data instances by how the model's output reacts to the modified feature. For data instances in a data set, a selected feature for evaluation has its value modified to determine the output of the model if the feature for that instance were set to the modified value. The varied feature value for the feature and associated model output is used to determine an instance-feature variation plot (e.g., an ICE plot) for each instance in an evaluated data set.

To cluster the data instances, the instances are clustered based on the instance-feature variation plots and similarity of the model output when varying the selected feature. In one embodiment, the data instances are clustered with a k-means clustering algorithm. The number of clusters to use for clustering may be determined by manual selection or automatically determined based on a statistical measure, such as the silhouette score or sum of squared error for candidate clustering options (e.g., the number of clusters). The effect on the model output as a function of the varied feature for the different data instances may be visually presented to the user to view and understand how the output of the model is affected by the different values of the selected feature for the different data instances. The user may be presented with the clustered data instances to view the instance-feature variation plots and the different effects of the feature variation on different clusters of data instances. In complex data sets, this can more readily enable a user to explore how different regions of the data feature space behave with respect to real data samples.

The user may further interact with the visualization to further explore the data. First, the system may analyze the clusters to identify one or more additional features (i.e., different than the selected feature) that correlate with or explain the different outputs of the different clusters. To determine the additional feature(s), a shallow decision tree may be trained on the data with the cluster membership as a label to be learned, such that the decision tree learns a feature (different from the selected feature) and a respective value that most successfully predicts the cluster membership. The other feature and its value may be displayed along with information showing how the feature distinguishes between the clusters, helping the user to understand relationships between the clustering (describing different data instance behavior with respect to model outputs) and characteristics of the underlying data instances. In addition, a histogram or other visual display of the values of the other feature for the different clusters may be shown for a user to explore these relationships. In addition, the analysis may identify and display outliers within a cluster and enable exploration of other within-cluster relationships between data instances.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Architecture Overview

Figure 1:
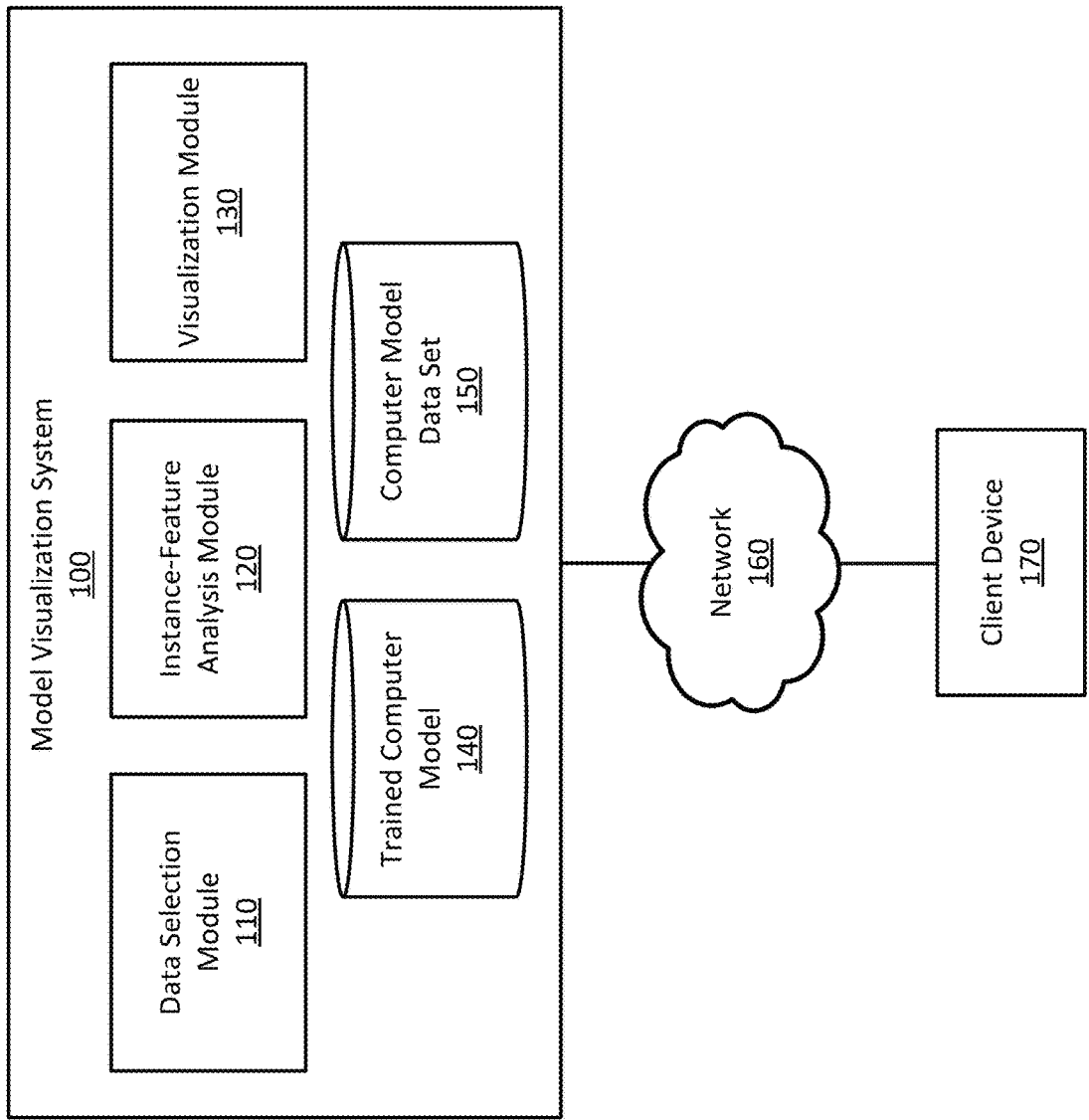
FIG. 1 is an example environment for a model visualization system, according to one embodiment.

FIG. 1 is an example environment for a model visualization system 100, according to one embodiment. The model visualization system 100 provides visualization information to a client device 170 for presentation to a user of the client device 170 via a network 160. The network 160 provides a communication channel between the model visualization system 100 and the client device 170. The model visualization system 100 includes a trained computer model 140 which may be a computer model the provides an output based on a multi-dimensional (e.g., multi-feature) input. A particular input for the trained computer model 140 is termed a data instance. The multi-dimensional input may be represented as a feature vector, such that each value in the vector represents the value of a different feature. While features may be typically described herein as integers for simplicity, in practice the features may describe characteristics of the data instance with any suitable data type or structure in which the value may be represented with different values, such as a percentage, float, Boolean values, etc. The individual features of the feature vector may thus be represented in the feature vector with the corresponding data type which may differ across the individual features. The computer model may include various layers to process an input to generate an output according to the structure of the layers and the trained parameters of the trained computer model 140. The various layers may include layers that reduce the dimensionality of the data, determine intermediate representations, and various further processing and functions (e.g., activation functions) for generating an output. In general, these various layers may be difficult for a human user to understand directly, as the trained parameters may not readily be understood with respect to how any particular feature changes outputs of the model and how different regions of the input space are modeled.

The model visualization system 100 thus provides various modules and data for a user of the client device 170 to more intuitively understand the relationships between inputs and outputs of the computer model to gain insight into the model whose complexities and parameters may otherwise render it a "black box" without clear explanation of the translation from input to output. The model visualization system 100 may thus generate various interfaces for display to the user for analyzing, exploring, and understanding the performance of the model. The client device 170 may be any suitable device with a display for presenting the interfaces to a user and to receive user input to navigate the interfaces. As examples, the client device 170 may be a desktop or laptop computer or server terminal as well as mobile devices, touchscreen displays, or other types of devices which can display information and provide input to the model visualization system 100. In some circumstances, the functions of the client device 170 may be performed by the model visualization system 100 and these may not be separate devices, such as when the model visualization system 100 itself is instantiated on a computing device that directly displays information to a user.

In addition to the trained computer model 140, the model visualization system 100 may include a computer model data set 150 for exploring the behavior of the model in the visualization. The computer model data set 150 includes various data instances that may be processed by the model for generating respective outputs. The computer model data set 150 may include training data (from which the trained computer model 140 was trained), in addition to validation data (which did not train the model, but for which known labels for evaluating the model's performance may be known), and may include data that did not form any part of the training process. In general, different data sets may include data that describes different portions of the feature space for the input feature vector. That is, each of the features may have a number of possible values, and each data set may include data instances having different combinations of each feature, such that each data set may include different "regions" of possible values of input data. As one use of the model visualization and analysis discussed herein, the model may be retrained or otherwise modified when the visualization or analysis of different data sets substantially differs.

The model visualization system 100 includes various computing modules for performing the data analysis and providing visualization of the trained computer model 140 to the client device 170. The model visualization system 100 includes a data selection module 110 for selecting a data set for visualization and analysis. The particular data set may be selected by a user of the client device 170 and may be selected from the computer model data set 150. The selected data set may be a subset of all data available in the computer model data set 150 or may be, e.g., training data, validation data, recently collected data, and so forth.

To perform further analysis, the instance-feature analysis module 120 may generate an instance-feature variation plot for each of the data instances with respect to a selected feature of the feature vector. The instance-feature variation plot describes the relationship between different values of the selected feature the resulting model outputs, while keeping other features of the data instance constant. For example, the data instance vector (i.e., its feature vector) may include ten different features, and the second feature may be selected and set to different values, such that the data instance may be evaluated by the model as though the data instance had those different values of the second feature. In one embodiment, the instance-feature variation plot is an individual conditional expectation (ICE) plot. The generation of an instance-feature variation plot is further discussed below with respect to FIG. 2.

The visualization module 130 performs additional analysis based on the selected data set and the instance-feature variation plots generated by the instance-feature analysis module 120. The visualization module 130 may, for example, identify clusters of data instances based on the instance-feature variation plots and present the clusters for display to the user. In addition, based on the clusters, additional interfaces may be selected for identifying outliers of the clusters, cluster interpretation with respect to other data features, and analysis of individual data instances as discussed below. The various analysis and visualizations may be generated and provided for display by the client device 170 to the user. The visualization module 130 may also provide user interface elements for the user of the client device 170 to manage selection and manipulation of the various interfaces and to transition between different analytical views. For example, the interfaces may include interface elements for selecting data sets for analysis, viewing instance-feature variation plots, and viewing data instance cluster data.

Figure 2:
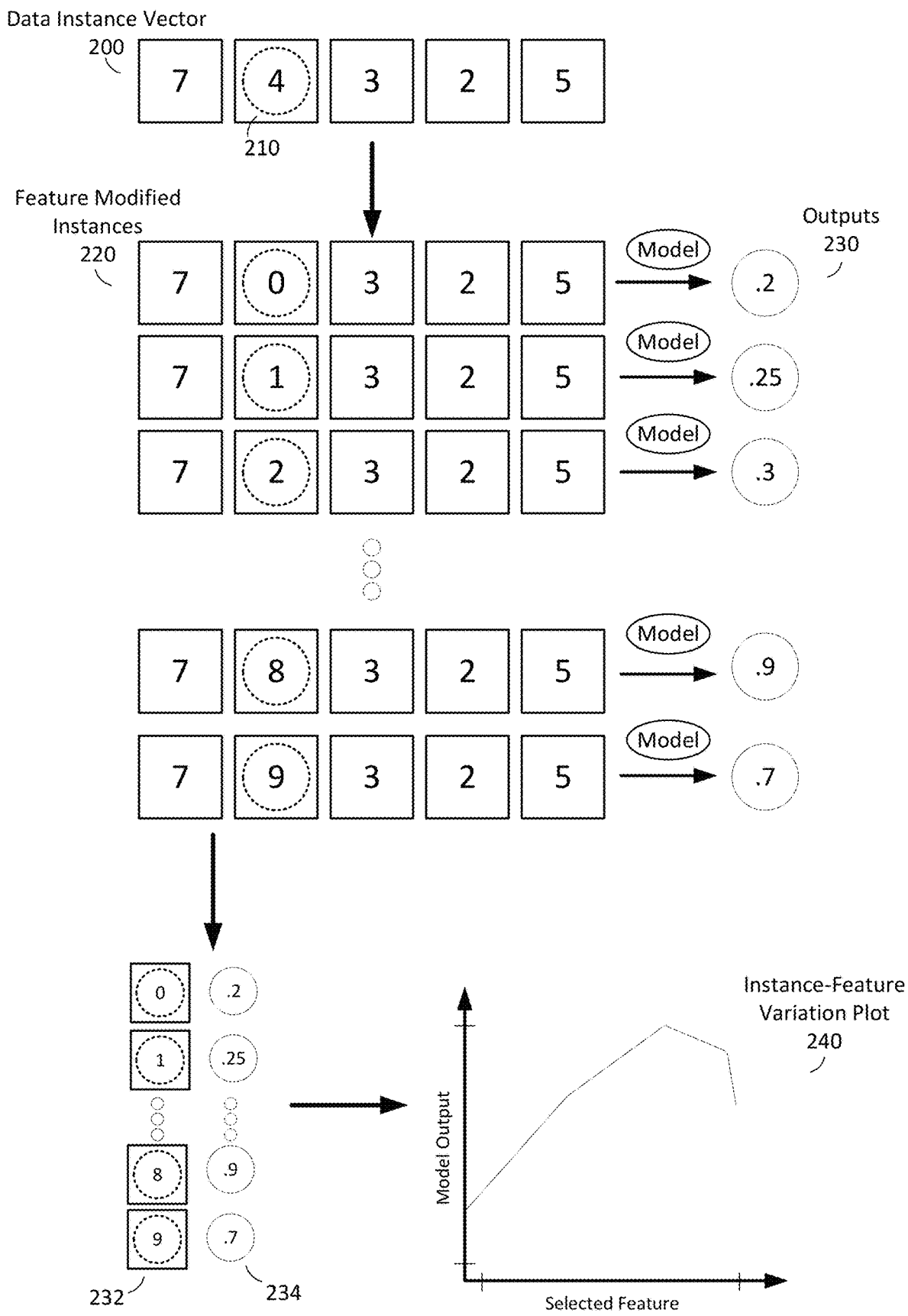
FIG. 2 shows an example generation of an instance-feature variation plot, according to one embodiment.

FIG. 2 shows an example generation of an instance-feature variation plot 240, according to one embodiment. For each selected data instance, the data instance is associated with a data instance vector 200 (also referred to as a feature vector) that includes a value for each feature of the data instance. In the example of FIG. 2, the data instance vector 200 has five features. Each of the various features may have a range of possible values, based on the range of the data structure used to represent the feature or based on the values of a data set. The range may be based on a data set from which the computer model was trained (e.g., the training data includes data instances having values of −15 through 68, forming a range of [−15, 68] for the feature), or may be based on a data set being evaluated. In some instances, the feature space may be multivariate and correlated, such that the effective range for one feature may be correlated with the range for another feature. For example, when a first feature has a value of 5, a second feature in the data set may have a range of 8-15, while when the first feature has a value of 40, the second feature may have a range of 0-5.

To generate the instance-feature variation plot 240, a feature is selected for analysis. In this example, the second feature is the selected feature 210 having a value of 4 in the data instance vector 200. The selected feature 210 is the feature to be evaluated for its effect on the output generated by the model. To determine the effect, a set of feature modified instances 220 is generated in which the value of the selected feature 210 is set to different values in the different feature modified instances 220. The different values set for the feature modified instances 220 may be based on the range for the feature. In one example, the feature may be modified to different values in the range of all possible values of the feature. In other examples, the feature may be modified to values present within the selected data set (e.g., if the data set includes values from 5 to 13, the feature modified instances 220 may include values 5 through 13).

Next, for each of the feature modified instances 220, the model is applied to the feature modified instance 220 to generate the respective output(s) 230. As the data instance may maintain the same values for the other features (i.e., the features that are not selected to be modified), the feature modified instances and associated outputs 230 may show how the model's output for that particular data instance is affected by different values of the selected feature 210. Each value of the selected feature may then be associated with the resulting output from the model in an array of selected feature values 232 and associated outputs 234 for the data instance vector 200, which may then be visually shown as an instance-feature variation plot 240. As such, the instance-feature variation plot 240 visually shows the relationship between modifying the value of the selected feature and its effect on the model's output. In one embodiment, the output 230 used as the output 234 for the instance-feature variation plot directly (e.g., a value as output from the model without modification), and in another embodiment the outputs may be smoothed, normalized, or otherwise processed to be used as the outputs 234 in the instance-feature variation plot 240. In one example, after generating the outputs 230 for the individual feature modified instances 220, individual outputs 230 may be modified to reflect the value relative to the other outputs 230, such that the outputs 234 reflects the relative value output value 230 for the feature values 232. For example, the output values 234 may reflect the difference in output value relative to a benchmark output value defined by the maximum or minimum value of outputs 230, or by the output 230 having a first or last value in the range for the selected feature in the feature modified instances 220 (i.e., an output 230 of the feature-modified instance 220 with the highest or lowest modified feature value). The particular modification of the outputs 230 for the outputs 234 used in the instance-feature variation plot 240 may also be configurable by the user, such that the user may select whether to use the raw output 230 or a modified output as the output 234 in the plot.

Figure 3A:
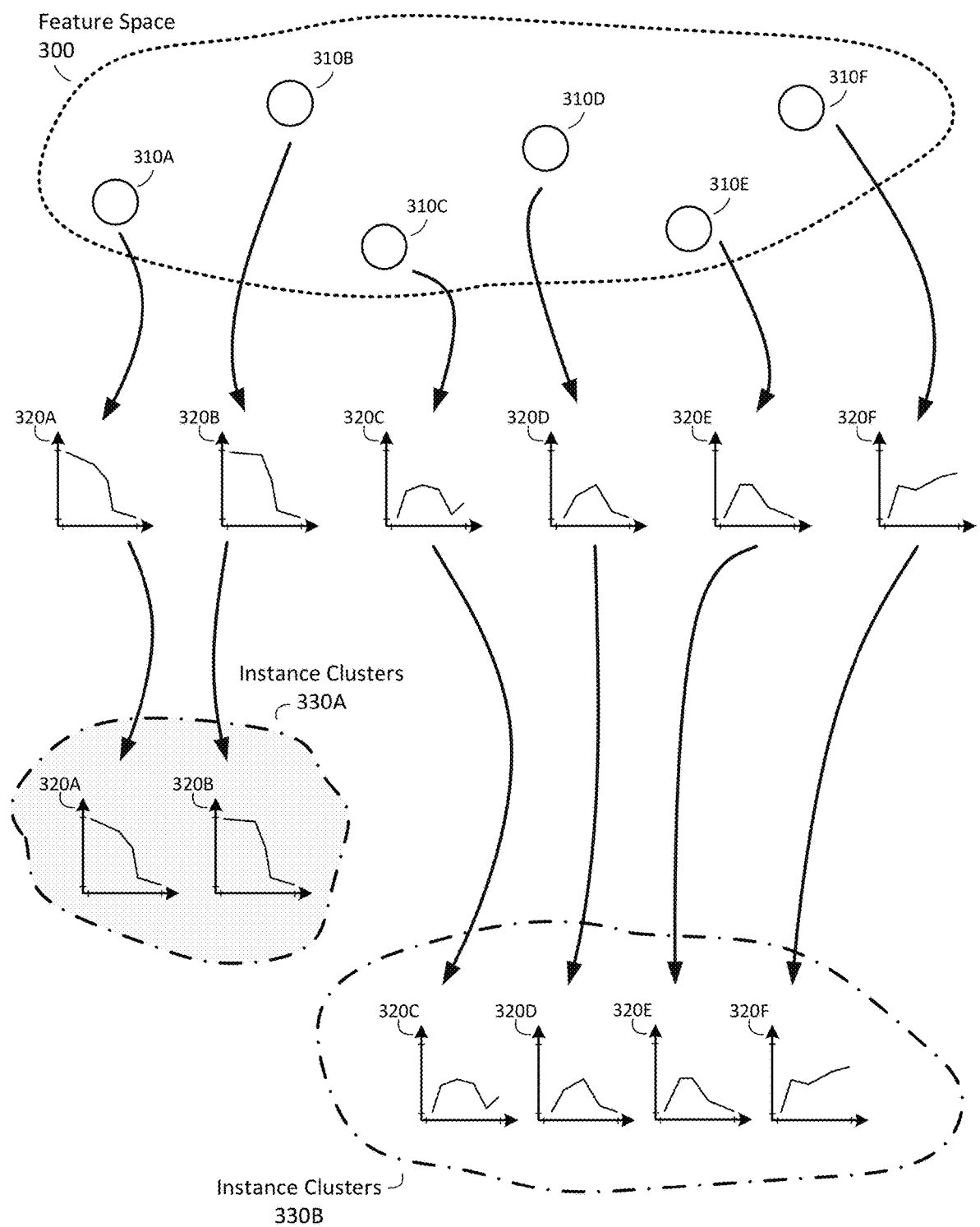
FIGS. 3A-B show example analysis of data instances based on instance-feature variation plots, according to one embodiment.
Figure 3B:
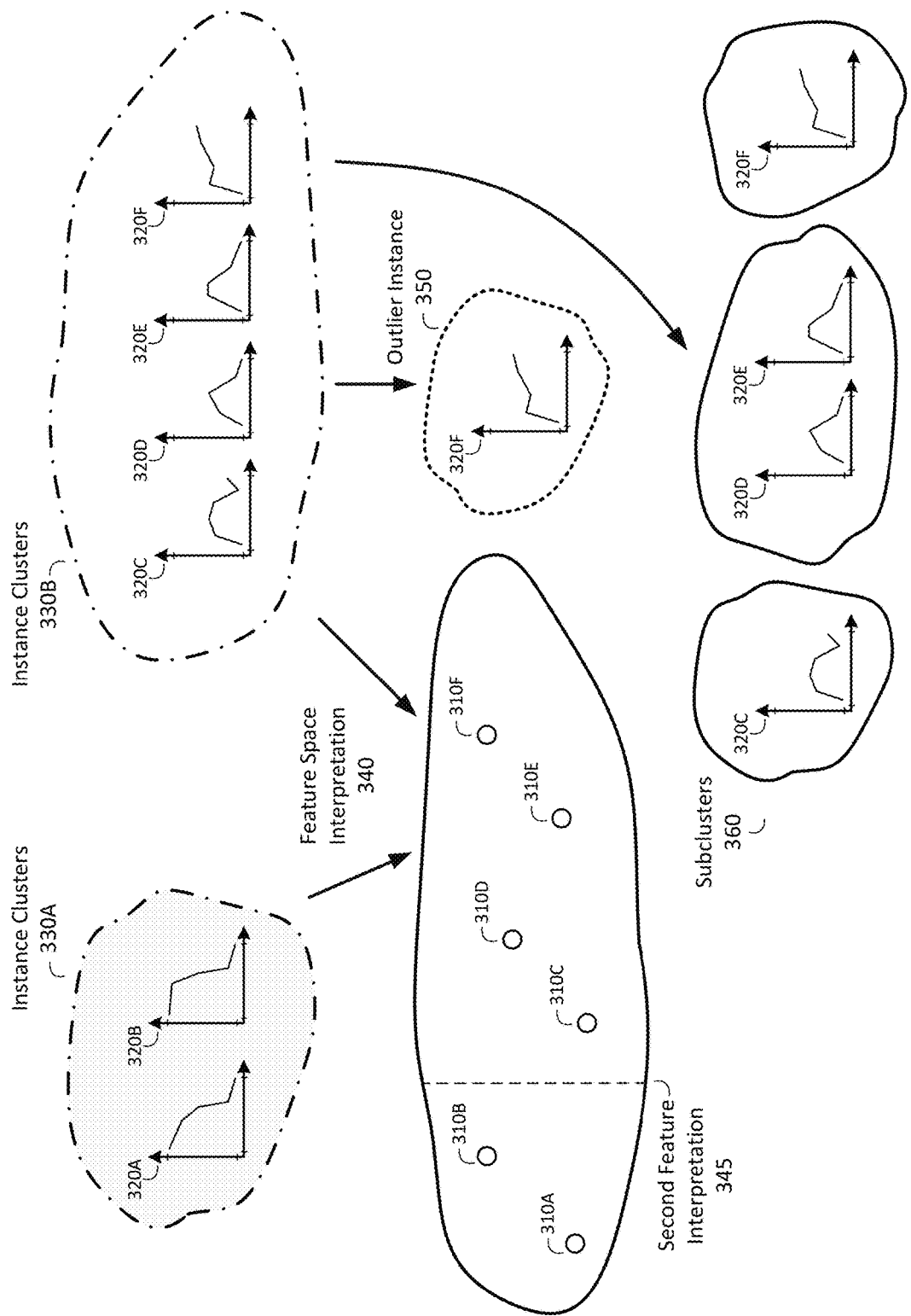

FIGS. 3A-B show example analysis of data instances based on instance-feature variation plots, according to one embodiment. As discussed above, individual data instances 310A-F may represent different portions of a feature space 300. The feature space 300 conceptually illustrates a region of possible feature values in which the selected data set (here, data instances 310A-F) is positioned. Stated another way, the range of feature values for the various features in the feature vector may be considered as a multidimensional "space" in which individual combinations of feature values represent dimensional positions within the multidimensional space. As such, as shown in FIG. 3A, each data instance 310A-F is located at a different position in the feature space 300. After selecting the data set, a feature may be selected for analysis (e.g., by a user's selection in an interface), and instance-feature variation plots 320A-F are generated for respective data instances 310A-F for the selected feature.

To provide further analysis of the data instances, the data instances are clustered based on the instance-feature variation plots 320 to identify instance clusters 330A-B. The clusters may be generated based on similarity of the data instances with respect to the instance-feature variation plots 320A-F. That is, for each data instance 310, the instance-feature variation plot 320 provides different values for the selected feature and an associated model output, such that the clustering may be based on the similarity of the model outputs for the same modified values of the selected feature and how the outputs vary across the different feature values. As the features of the data instance may remain the same, the clustering of the instance-feature variation plots 320 into instance clusters 330A-B identifies groups of similar-behaving data instances when the selected feature is modified.

In one embodiment, the clustering performed with a k-means clustering algorithm, although other clustering techniques may also be used. The number of clusters to be used may be selected by the user or may be automatically determined (or suggested) based on a statistical measure, such as silhouette scores or sum of squared error and is further discussed below. While this example includes six data instances 310A-F and corresponding six instance-feature variation plots 320A-F, data sets in practice may include hundreds, thousands, or more data instances 310, such that the clustering may provide effective means of surfacing otherwise unseen groups of data instances that have similar prediction profiles with respect to modifying the selected feature. The clustering of the data instances provides a means for identifying regions of the feature space 300 that provide similar behavior with respect to the model's output, enabling surfacing of underlying differences in how the data behaves, providing additional and intuitive insight into the different ways that the model behaves for different regions of the feature space 300 with respect to the selected data set.

The instance clusters 330A-B may then be displayed to the user in various ways to illustrate the different behavior of the instance-feature variation plots. These visualizations are shown below with respect to FIGS. 4A-6. In addition, the instance clusters 330 may be used for further analysis and exploration of the clusters, including cluster interpretation, outlier analysis, and further sub-clustering.

The instance clusters 330A-B may be used to generate a feature space interpretation 340 of the feature space 300 with respect to one or more other features that were not the selected feature used for the instance-feature variation plots 320A-F. As such, the feature space interpretation 340 may be used to explain the different behaviors of the clustered data instances with respect to the similar behavior in the instance-feature variation plots 320 as different distributions of one or more other features. Stated as a question, because the clustering was based on the similarity of model outputs with the same variation of the selected feature, what other feature (s) of the data in the respective clusters may explain the similar model predictions for the data instances? To identify the most relevant other features that may explain the different model predictions, a computer model may be generated in which the data features are used as an input to predict the membership of a data instance in the respective clusters. The membership in a cluster (e.g., instance cluster 330A or 330B) for the respective data instance may then be used as a label for the data instance, and a model may be trained to predict membership based on the features (other than the selected feature that was varied for the instance-feature prediction plot). In one embodiment, the computer model is a decision tree with decision nodes that each learns a feature and a decision value that best predicts membership in the respective clusters. In one embodiment, the decision tree is a shallow decision tree, having a relatively low depth (e.g., 1, 2, or 3 nodes), such that each learned feature and respective decision value describes the membership of the data instances 310 with respect to the instance clusters 330. The number of nodes in the decision tree may also represent the number of features used to interpret the clusters and characterize membership in the clusters according to other features. In a shallow decision tree with one node and two clusters, for example, the decision node may identify a feature (e.g., age) and corresponding a decision value (e.g., age <=55) that best explains cluster membership of the respective data instances (e.g., 95% of data instances in have age <=55 and cluster 2 includes 95% data instances with age >55). The feature and respective value may be displayed as a second feature interpretation 345 for explaining cluster membership of the data instances 310A-F.

The outlier instance 350 may provide an identification of one or more outliers (here, data instance 310F and its respective instance-feature variation plot 320F) within an instance cluster 330 that may be further explored for a user to visually understand how an outlier instance 350 differs from the other data instances in a cluster, as further discussed below. Outliers of a particular cluster may represent data instances that, while clustered with a group, nonetheless behave sufficiently differently from the typical or normal behavior for the cluster. An outlier may be determined for the cluster based on various metrics. As one example embodiment, an outlier may be determined based on a Euclidian distance to a cluster center of the instance-feature variation plots, in which an outlier is identified by a distance d based on an Inter-Quartile Range of the distance. In one configuration of this embodiment, the distance d for each instance-feature variation plot to the Euclidian center is determined and quartiles $Q_1$ ($25^{th}$ percentile) and $Q_3$ ($75^{th}$ percentile) are determined for the distance values and a data instance is determined as an outlier when $d>Q_3+1.5(Q_3-Q_1)$. In this example, the data instance is an outlier when the distance for a data instance is greater than $Q_3$ plus 1.5 times the inter-quartile range.

As another example for further data exploration with the instance clusters 330, an instance cluster 330, such as instance cluster 330B in this example, may be the source for identification of subclusters 360. To generate the subclusters 360, the data instances within an instance cluster (here, instance cluster 330B) may be selected as a dataset for further analysis and may be further clustered similar to the clustering of the original data set.

Interfaces may be displayed to the user for visually viewing instance-feature variation plots, generating and understanding clusters, and providing further analysis as further discussed below. The user may navigate, for example, to interfaces for selecting a data set, generating instance-feature variation plots, and viewing clusters of the data instances based on the plots. Users may then further explore various visualizations of the data set and its clusters as discussed below.

Figure 4A:
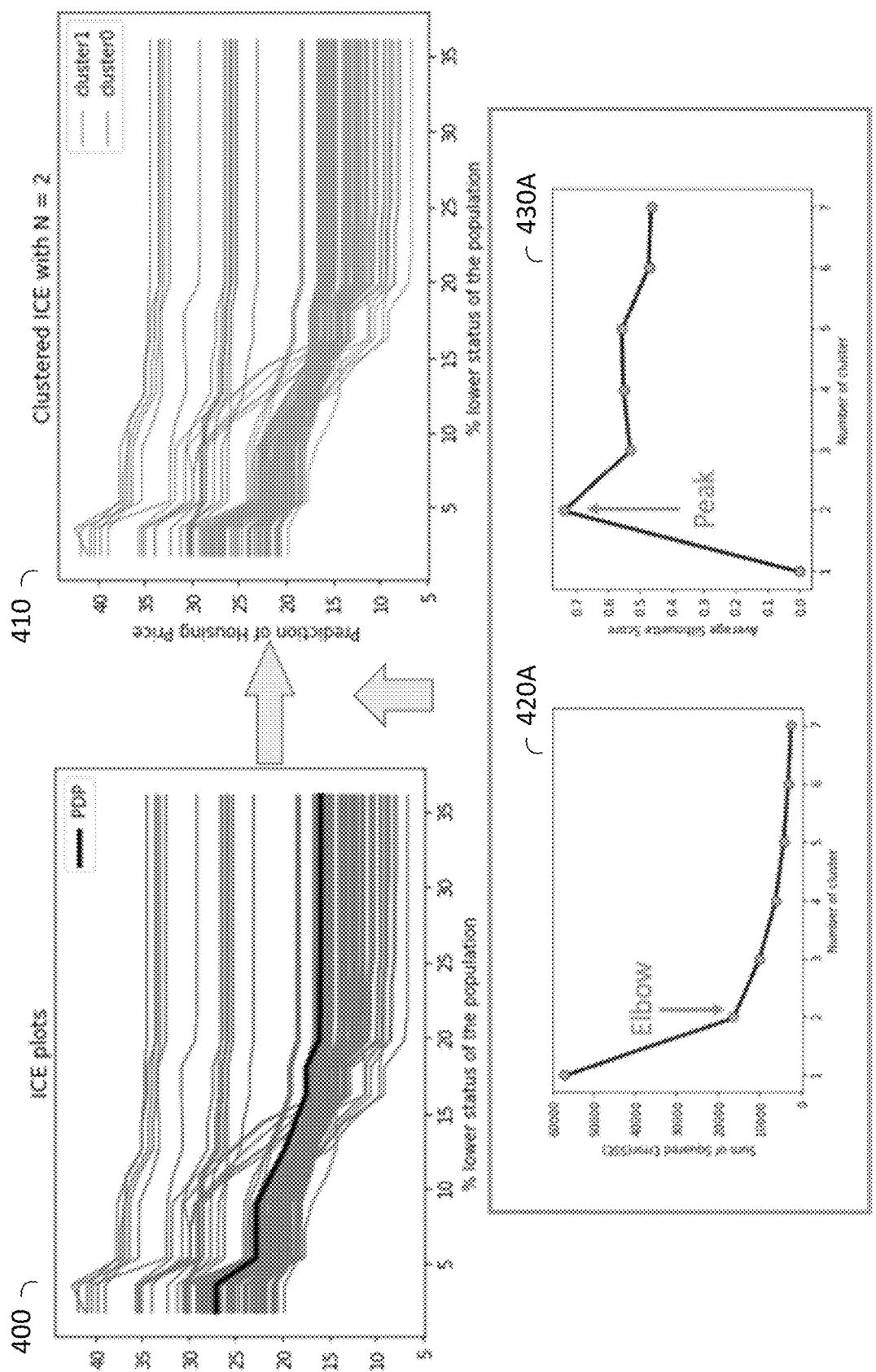
FIGS. 4A-D show example interfaces for data cluster visualization and analysis, according to one embodiment.

FIGS. 4A-D show example interfaces for data cluster visualization and analysis, according to one embodiment. FIG. 4A shows example interfaces for viewing feature-instance variation plots for the data set and the resulting clustered data. In this example, the feature-instance variation plots are ICE (individual conditional expectation) plots, although other types of feature variation plots may be used. A data set interface 400 may be shown that illustrates the feature-instance variation plots for the data instances of a data set. In this example, a model predicting housing price based on a multi-dimensional data set is shown. Specifically, this example shows an analysis of a model based on the Boston Housing Dataset, in which different characteristics of a home and its environment are described by the feature vector, including features describing, e.g., the number of rooms in the home, home size, and environmental characteristics like the surrounding neighborhood income and status.

In the example data set interface 400, the selected feature for the instance-feature variation plot (e.g., which is set to different values) is the feature describing a percentage of the population in the neighborhood characterized as a "lower status" in the data. As shown by the data set interface 400, in general the output from the model decreases as the percentage increases, although there are some data instances that appear to decrease more significantly than others. Understanding which data instances may behave this way, however, may be difficult from this visualization. The clustering interface 410 illustrates the result of data instances into two clusters, in which the different responses of the model outputs to varying the selected feature can be more clearly seen—in the data instances labeled cluster 0, while there is some effect on the output when increasing the selected feature percentage of lower status, the effect is significantly less than those labeled cluster 1. The clustering of the data instances and selection of data instances for the individual clusters and visual presentation of the clusters enables a user to more clearly identify and explore the operation of the computer model.

Figure 4B:
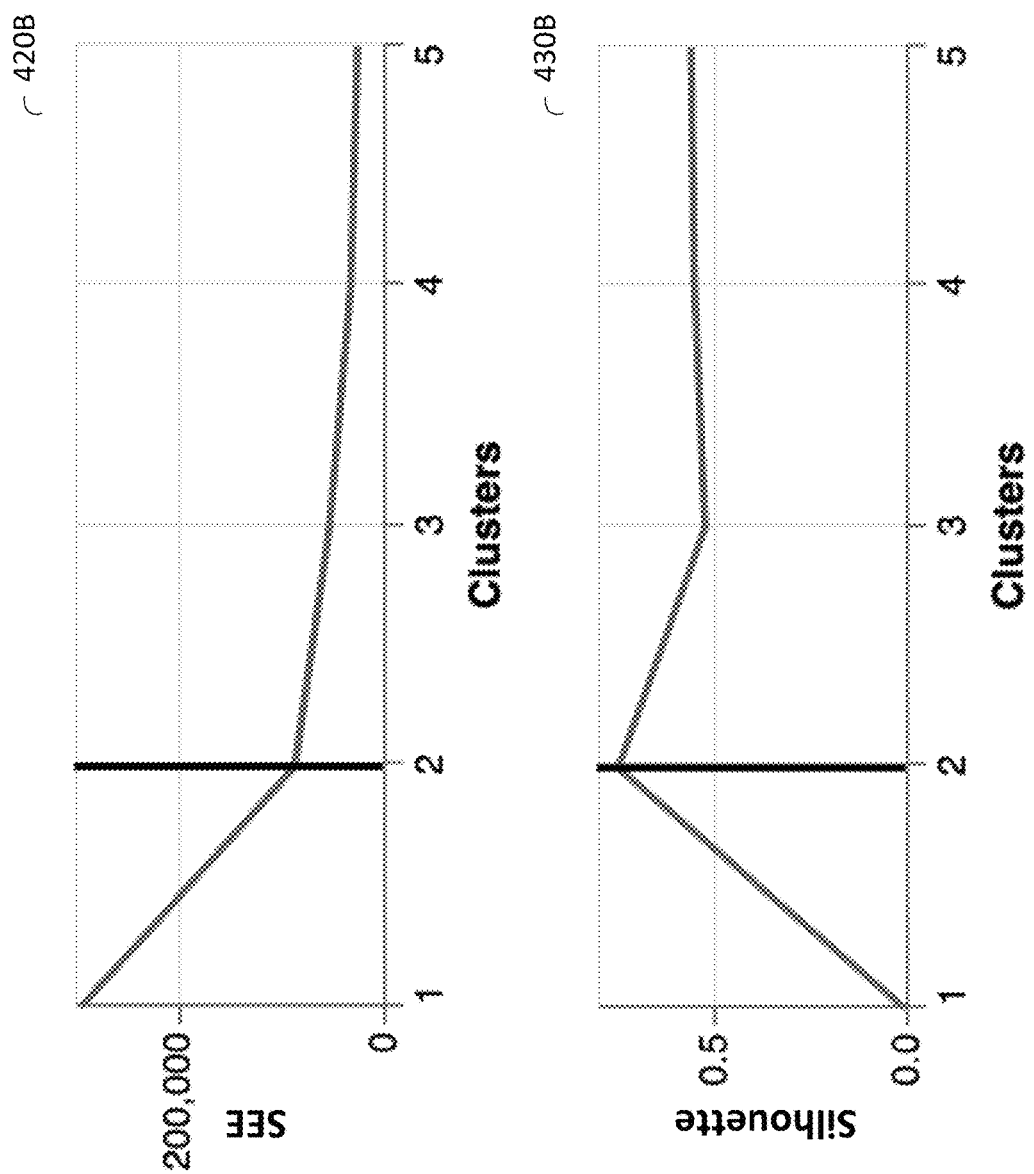

In one embodiment, the user may select a number of clusters to be used in clustering. To aid in the clustering, statistical metrics may be calculated based on different numbers of clusters that may be used. The statistical metrics may be presented to the user to aid in the user's selection of the number, or the statistical metrics may be used to automatically select the number of clusters. Various statistical metrics may be used in various embodiments. In FIG. 4A, two such metrics are shown that may be displayed to a user in an interface showing the sum of squared error 420A (SSE) or silhouette score 430A evaluated for different numbers of clusters. In general, the SSE metric decreases as the number of clusters increases, such that an "elbow" at which the incremental reduction of SSE falls off may be indicated as a preferred number of clusters, and in one embodiment may be automatically selected as the number of clusters. The elbow may be automatically determined when the reduction in the SSE metric after increasing the number of clusters is not larger than the reduction of SSE for the prior number of clusters. That is, the incremental reduction in SSE is significantly lower for a subsequent number of clusters. For the average silhouette score, the number of clusters corresponding to the "peak" of the silhouette score (e.g., as an inflection point) at which the score subsequently decreases may be automatically selected as the number of clusters. FIG. 4B shows an expanded view of SEE 420B and silhouette score 430B in other examples. As also shown in FIG. 4B, the number of clusters may be automatically selected based on the respective "elbow" and "peak" of these metrics. Other statistical metrics may be used for automatically selecting the number of clusters, for which different approaches may be used to select the number of clusters based on the value of the metrics as they change over the number of possible clusters.

Figure 4C:
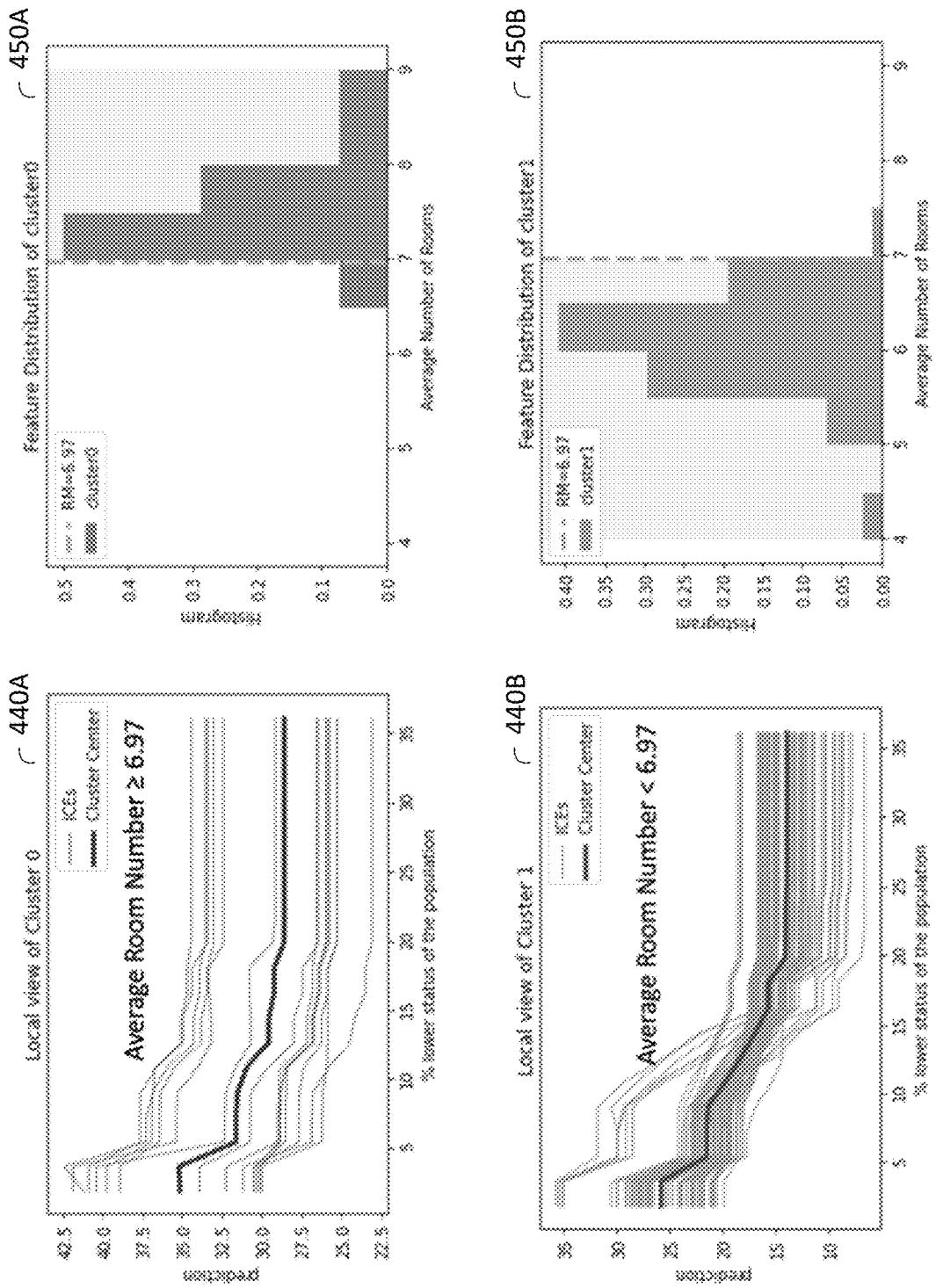
Figure 4D:
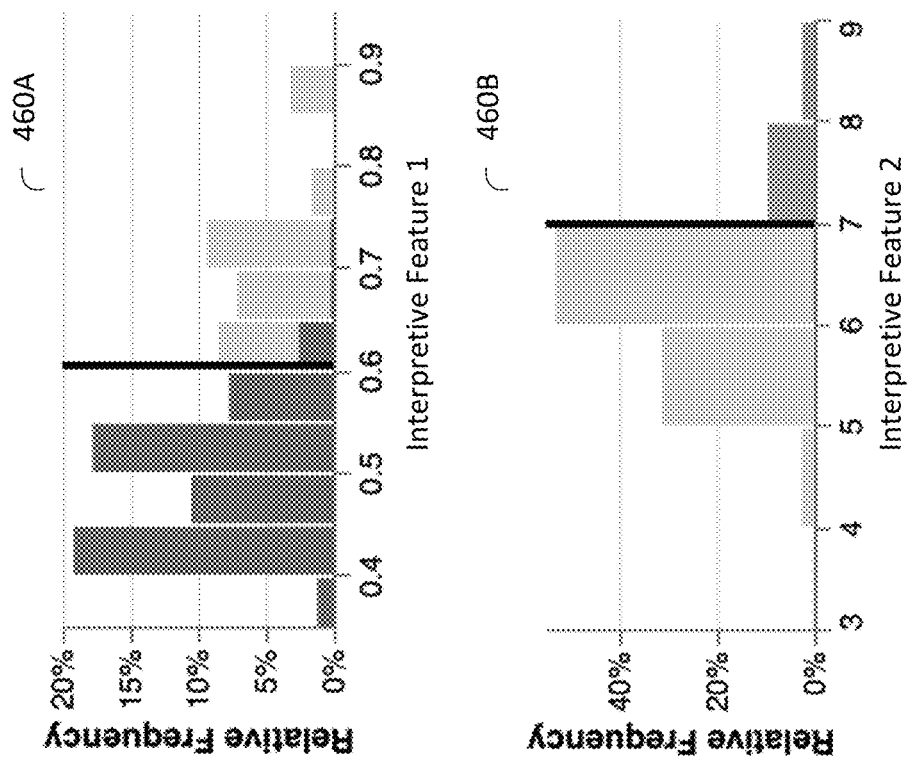

FIG. 4C shows example interfaces for exploring characteristics of the different clusters. The user may view the clusters generated for a data set as shown in FIG. 4A and navigate to interfaces to explore characteristics of individual clusters. A local cluster view 440 may be presented, such as cluster views 440A for cluster 0 and cluster view 440B for cluster 1. The cluster view 440 may present the instance-feature variation plot for only the data instances belonging to cluster. In addition, the feature interpretation of the clusters may also be displayed with a visual display of a feature that describes the difference between the clusters. As discussed above, a decision tree (or another approach) may be used to identify another feature (a second feature) other than the selected feature that is associated with cluster membership. In this example, the feature "average number of rooms" having a value of 6.97 is automatically determined by a shallow decision tree of one layer as the feature and value most explanatory of cluster membership. A visual display 450 of this feature may be provided to the user (in this case as a histogram of the feature "average number of rooms"), as shown in visual display 450A for cluster0 and visual display 450B for cluster1, and the respective values for data instances in each cluster. As shown in this example, the data instances in cluster 0, which had a reduction in predicted value as the selected feature "% lower status of the population" generally smaller than the reduction for cluster1, have a distribution of another feature, the number of rooms, higher than 6.97. By the automatic clustering and cluster interpretation, users may more readily identify these additional relationships in predictions by "black box" computer models. While one feature is shown here as generally predicting membership in either cluster 0 or cluster 1, in other embodiments, more complex decision trees may use more than one feature and may predict membership in additional clusters to interpret the cluster membership, according to other features. FIG. 4D shows another embodiment for displaying a visual interpretation of cluster membership. In this example, histograms 460A-B of cluster membership with respect to features explaining is shown, in which the clusters are shown on the same histogram, such that the relative distribution of the interpretation features may be viewed across multiple clusters in the same display.

Figure 5:
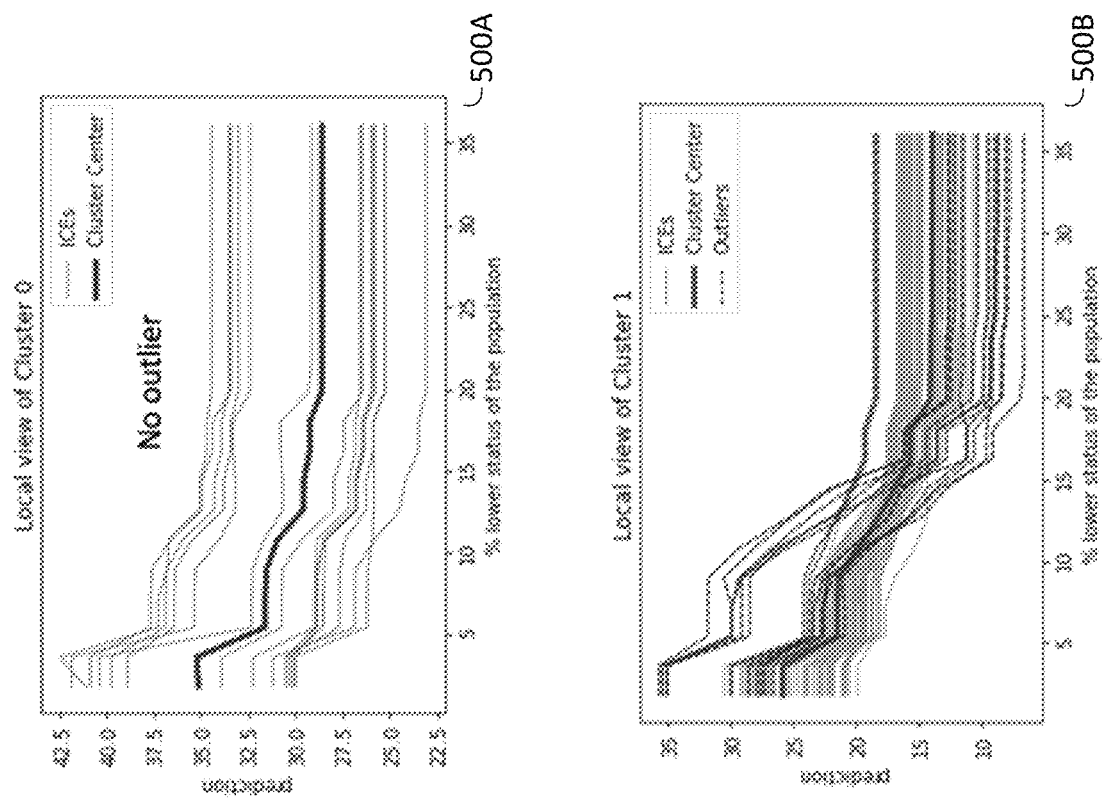
FIG. 5 shows example interfaces for outlier identification, according to one embodiment.

FIG. 5 shows example interfaces for outlier identification, according to one embodiment. To illustrate outliers, a user may select a cluster and view an interface highlighting outliers within the cluster, if any. The outliers may be identified based on statistical metrics as discussed above, and may, for example, be determined based on distance from a Euclidean center or other measures of variation and divergence. In the outlier display 500A, the view of cluster 0 does not have any outliers, as the while the outlier display 500A illustrates a number of data instances that are outliers with respect to the other data instances of the cluster. In outlier display 500B, these outliers may be readily determined as having a significantly different profile in the instance-feature variation plot relative to other members of the cluster. By clustering data instances and providing an identification of outliers, a user may more effectively explore the model's prediction for various data instances. After identifying outliers, a user may decide to increase the number of clusters or determine subclusters within the cluster (in which case some outliers may generally form a cluster together), or the user may further explore the characteristics of the outliers.

Figure 6:
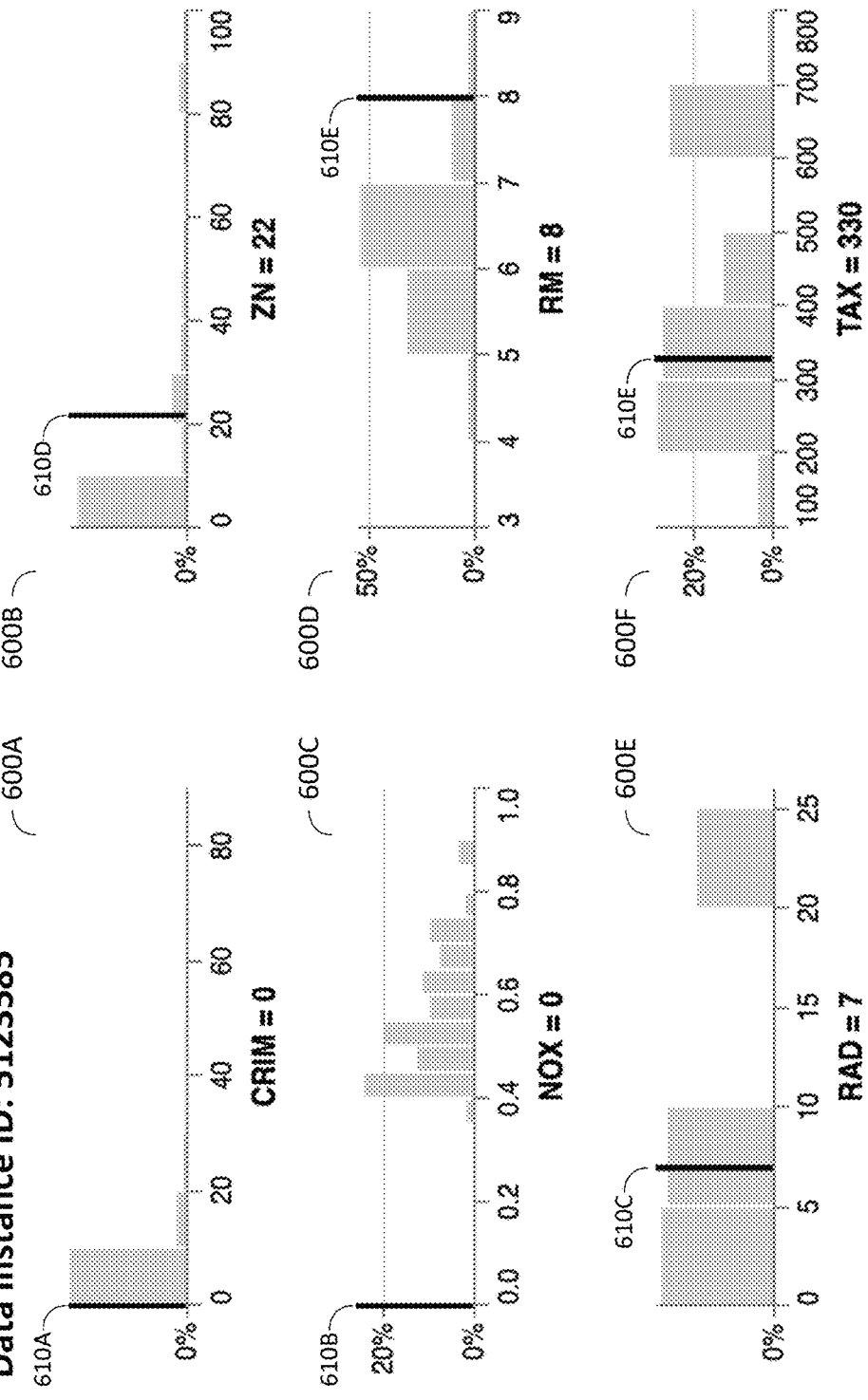
FIG. 6 provides an example interface for examining an outlier with respect to the data values of the outlier with respect to the cluster, according to one embodiment.

FIG. 6 provides an example interface for examining an outlier with respect to the data values of the outlier with respect to the cluster, according to one embodiment. In this example, an interface may provide a histogram 600 of the distribution of characteristics within the cluster, in this example of six features and respective histograms 600A-F of the feature values within the cluster. In addition, the particular value for the data instance may also be designated with an indicator 610, in this case indicators 610A-F. By showing the histograms and value of the data instance within, the location of the data instance with respect to the typical values of the cluster in the feature space may be readily understood by the user. For example, this interface may make it apparent that the feature may be particularly different to other data instances in the cluster with respect to the features "NOX" "ZN" and "RM." These characteristics may explain the different behavior of the model and may be features which a user chooses to further explore, for example by selecting one of these features as the "selected feature" for generating new instance-feature variation plots and exploring the effect of changing that feature on model prediction.

Taking the illustrative interfaces together, a user may select a data set to view the instance-feature variation plots together and use metrics to select the number of clusters for further exploring the data. After clustering, the user may navigate to interfaces for viewing how the clusters differ with respect to other features of the data, which may include interpretive features and respective values that explain membership in the clusters with respect to the other features of the data. In addition, the user may explore clusters by viewing the behavior of that cluster and investigate outliers or further subcluster the data.

In addition to visualization, as another application of the instance-feature variation plot clustering, the difference in clustering and outliers between different data sets may be used to identify significant differences in the data sets, and may suggest, for example, modifications to the model. For example, the data set on which the model was trained may be evaluated and automatically clustered based on the metrics as having two clusters with few outliers. Another data set, such as a data set collected during application of the model (e.g., for which the model's output may be intended to be used) may automatically be clustered into a different number of clusters and/or include a higher portion of outliers than the first data set. This may suggest that the second data set includes data in different regions of the feature space than the first region, and that while the model may effectively have learned the first data set, that the second data set yields different output characteristics than the first. As another approach, the data of the second data set may be grouped into the clusters of the first data set to identify whether the second data set has significantly more outliers relative to the data instances in the clusters of the first set. In either of these cases, differences in model predictions and associated clustering for the model predictions of a selected feature may indicate that the same model may not perform as expected for both data sets. When the model is trained on the first data set, for example, sufficient difference between the two data sets may indicate that the model should be retrained to include the second data set. As an additional variation, the comparison of the different cluster similarity across data sets may be compared with several different selected features (e.g., with different features varied to form the instance-feature variation plots and resulting clusters). The data sets in some embodiments may be considered sufficiently different for modifying (e.g., retraining) the model when the clusters are dissimilar for several different selected features.

Finally, the difference in model prediction, as characterized by the generated clusters and outliers, may be used to select a model for use with a particular data set. In this example, a set of computer models may have been trained with a training set (or different respective data sets), which may each represent different structures, complexities, or approaches for generating an output for a particular type of input. Although the models may be dissimilar in overall prediction quality accuracy, there may be regions of the input feature space in which individual models perform better than others. Similarity of clustering between the training data and to-be-evaluated data may suggest which model will perform better when applied to the to-be-evaluated data. The training set (or respective training set) may be characterized based on the clusters for a particular feature. For a data set to be evaluated, each model may be used to generate outputs and respective instance-feature variation plots along with a number of clusters. The data set to be evaluated may be compared to the clusters of the training data for the respective models (e.g., as outliers to the clusters of the training sets for the respective models). Such a model is selected based on the similarity between clustering of the training data and the to-be-evaluated data set.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A system for visualizing feature variation effects on computer model prediction, comprising:
   a processor; and
   a computer-readable medium having instructions executable by the processor for:
      identifying a trained computer model configured to generate an output value based on an input having a plurality of features;
      identifying a data set having a plurality of data instances, each data instance having a feature vector corresponding to the plurality of features;
      for each data instance in the plurality of data instances, generating an associated instance-feature variation plot describing model outputs of the trained computer model for a range of values for a first feature in the feature vector for the data instance;
      clustering the plurality of data instances to a plurality of clusters based on the associated instance-feature variation plots, each cluster describing data instances having similar model outputs with respect to the range of values for the first feature;
      labeling each of the plurality of data instances with the respective cluster associated with the instance;
      training an interpretation model to output predicted membership of a data instance in one or more clusters of the plurality of clusters based on features of the plurality of features other than the first feature with training data including the plurality of data instances using the associated cluster label as the output to be learned by the interpretation model;
      determining, based on the trained interpretation model, a second feature of the plurality of features, different from the first feature, and a decision value of the second feature that predicts membership in a first cluster of the plurality of clusters relative to a second cluster of the plurality of clusters, such that the second feature and decision value most correlate with the cluster membership describing data instances having similar model outputs of the trained computer model for the range of values for the first feature; and providing the clustered data instances for display to a user to view the effects of the first feature on the model outputs and an indication of the decision value of the second feature.

2. The system of claim 1, wherein the plurality of data instances is clustered with k-means clustering.

3. The system of claim 1, wherein a number of the plurality of clusters is automatically determined based on a statistical metric.

4. The system of claim 1, wherein the instructions are further executable for:
identifying an outlier data instance of a cluster of the plurality of clusters; and
providing information about the outlier data instance for display to the user.

5. The system of claim 1, wherein the interpretation model is a decision tree and wherein the second feature and the decision value are determined based a decision node of the decision tree.

6. The system of claim 1, wherein the instructions are further executable for providing a visual display of second feature values of the data instances associated with each cluster of the plurality of clusters.

7. The system of claim 1, wherein the instructions are further executable for:
comparing the plurality of clusters of the data set with a second plurality of clusters generated for instance-feature variation plots for the first feature of the model applied to another plurality of instances associated with a second data set;
determining that the data set and the second data set are sufficiently different based on the comparison; and
responsive to determining that the data set and second data set are sufficiently different, retraining the trained computer model with the second data set.

8. A method for visualizing feature variation effects on computer model prediction, comprising:
identifying a trained computer model configured to generate an output value based on an input having a plurality of features;
identifying a data set having a plurality of data instances, each data instance having a feature vector corresponding to the plurality of features;
for each data instance in the plurality of data instances, generating an associated instance-feature variation plot describing model outputs of the trained computer model for a range of values for a first feature in the feature vector for the data instance;
clustering the plurality of data instances to a plurality of clusters based on the associated instance-feature variation plots, each cluster describing data instances having similar model outputs with respect to the range of values for the first feature;
labeling each of the plurality of data instances with the respective cluster associated with the instance;
training an interpretation model to output predicted membership of a data instance in one or more of the plurality of clusters based on features of the plurality of features other than the first feature with training data including the plurality of data instances using the associated cluster label as the output to be learned by the interpretation model;
determining, based on the trained interpretation model, a second feature of the plurality of features, different from the first feature, and a decision value of the second feature that predicts membership in a first cluster of the plurality of clusters relative to a second cluster of the plurality of clusters, such that the second feature and decision value most correlate with the cluster membership describing data instances having similar model outputs of the trained computer model for the range of values for the first feature; and
providing the clustered data instances for display to a user to view the effects of the first feature on the model outputs and an indication of the decision value of the second feature.

9. The method of claim 8, wherein the plurality of data instances is clustered with k-means clustering.

10. The method of claim 8, wherein a number of the plurality of clusters is automatically determined based on a statistical metric.

11. The method of claim 8, further comprising:
identifying an outlier data instance of a cluster of the plurality of clusters; and
providing information about the outlier data instance for display to the user.

12. The method of claim 8, wherein the interpretation model is a decision tree and wherein the second feature and the decision value are determined based a decision node of the decision tree.

13. The method of claim 8, further comprising providing a visual display of second feature values of the data instances associated with each cluster of the plurality of clusters.

14. The method of claim 8, further comprising:
comparing the plurality of clusters of the data set with a second plurality of clusters generated for instance-feature variation plots for the first feature of the model applied to another plurality of instances associated with a second data set;
determining that the data set and the second data set are sufficiently different based on the comparison; and
responsive to determining that the data set and second data set are sufficiently different, retraining the trained computer model with the second data set.

15. A non-transitory computer-readable medium for visualizing feature variation effects on computer model prediction, the non-transitory computer-readable medium comprising instructions executable by a processor for:
identifying a data set having a plurality of data instances, each data instance having a feature vector corresponding to a plurality of features;
for each data instance in the plurality of data instances, generating an associated instance-feature variation plot describing model outputs of the trained computer model for a range of values for a first feature in the feature vector for the data instance;
clustering the plurality of data instances to a plurality of clusters based on the associated instance-feature variation plots, each cluster describing data instances having similar model outputs with respect to the range of values for the first feature;
training an interpretation model to output predicted membership of a data instance in one or more clusters of the plurality of clusters based on features of the plurality of features other than the first feature with training data including the plurality of data instances using the associated cluster label as the output to be learned by the interpretation model;
determining, based on the trained interpretation model, a second feature of the plurality of features, different from the first feature, and a decision value of the second feature that predicts membership in a first cluster of the plurality of clusters relative to a second cluster of the plurality of clusters, such that the second feature and decision value most correlate with the cluster membership describing data instances having similar model outputs of the trained computer model for the range of values for the first feature; and providing the clustered data instances for display to a user to view the effects of the first feature on the model outputs and an indication of the decision value of the second feature.

16. The non-transitory computer-readable medium of claim 15, wherein the plurality of data instances is clustered with k-means clustering.

17. The non-transitory computer-readable medium of claim 15, wherein a number of the plurality of clusters is automatically determined based on a statistical metric.

18. The non-transitory computer-readable medium of claim 15, wherein the instructions are further executable for:

identifying an outlier data instance of a cluster of the plurality of clusters; and providing information about the outlier data instance for display to the user.

19. The non-transitory computer-readable medium of claim 15, wherein the interpretation model is a decision tree and wherein the second feature and the decision value are determined based a decision node of the decision tree.

20. The non-transitory computer-readable medium of claim 15, wherein the instructions are further executable for:

comparing the plurality of clusters of the data set with a second plurality of clusters generated for instance-feature variation plots for the first feature of the model applied to another plurality of instances associated with a second data set;

determining that the data set and the second data set are sufficiently different based on the comparison; and responsive to determining that the data set and second data set are sufficiently different, retraining the trained computer model with the second data set.

* * * * *